(12) United States Patent
Goeschel et al.

(10) Patent No.: US 9,548,600 B2
(45) Date of Patent: Jan. 17, 2017

(54) DISK-SHAPED INSULATOR

(71) Applicant: SIEMENS AKTIENGESELLSCHAFT, Munich (DE)

(72) Inventors: Sebastian Goeschel, Schoenwalde (DE); Peter Milewski, Berlin (DE); Thilo Nehring, Berlin (DE)

(73) Assignee: Siemen Aktiengesellschaft, Munich (DE)

( * ) Notice: Subject to any disclaimer, the term of this patent is extended or adjusted under 35 U.S.C. 154(b) by 0 days.

(21) Appl. No.: 14/410,196

(22) PCT Filed: Jun. 11, 2013

(86) PCT No.: PCT/EP2013/062023
§ 371 (c)(1),
(2) Date: Dec. 22, 2014

(87) PCT Pub. No.: WO2013/189782
PCT Pub. Date: Dec. 27, 2013

(65) Prior Publication Data
US 2015/0325993 A1    Nov. 12, 2015

(30) Foreign Application Priority Data
Jun. 21, 2012 (CN) .......................... 2012 1 0212598

(51) Int. Cl.
*H02G 5/06* (2006.01)

(52) U.S. Cl.
CPC ................ *H02G 5/06* (2013.01); *H02G 5/068* (2013.01)

(58) Field of Classification Search
USPC ........................................................ 174/156
See application file for complete search history.

(56) References Cited

U.S. PATENT DOCUMENTS

| 3,356,785 | A | * | 12/1967 | Yoshida | H02G 5/066 174/127 |
|---|---|---|---|---|---|
| 3,652,778 | A | * | 3/1972 | Sakai | H02G 5/068 174/16.2 |
| 4,277,746 | A | | 7/1981 | Abe et al. | |
| 4,562,303 | A | * | 12/1985 | Czech | H01B 17/44 174/142 |
| 5,670,767 | A | * | 9/1997 | Kobayashi | H02G 5/068 218/3 |
| 6,818,828 | B2 | * | 11/2004 | Quaggia | H02G 15/068 174/73.1 |

FOREIGN PATENT DOCUMENTS

DE    102006040038 A1 *  3/2008  ............. H02G 5/068

\* cited by examiner

*Primary Examiner* — Timothy Thompson
*Assistant Examiner* — Krystal Robinson
(74) *Attorney, Agent, or Firm* — Laurence Greenberg; Werner Stemer; Ralph Locher

(57) ABSTRACT

A disk-shaped insulator contains a conductive block and an insulating body, wherein the conductive block is located in a central region of the disk-shaped insulator. The radial dimensions of the insulating body are adapted to those of a flange used for connecting. Multiple holes are distributed over an edge region of the disk-shaped insulator, and the edge region is covered by a conductive coating.

8 Claims, 2 Drawing Sheets

DISK-SHAPED INSULATOR

BACKGROUND OF THE INVENTION

Field of the Invention

The present invention relates to a disk-shaped insulator, in particular to a disk-shaped insulator for a metal-enclosed electrical device, for example a gas insulated switch.

Disk-shaped insulators are used for connecting conductors in a metal-enclosed electrical device and for electrically insulating the conductors from the housing. When there are multiple phases in the electrical device, the disk-shaped insulator is also used for electrically insulating conductors of different phases from each other.

German patent DE102006040038 discloses a disk-shaped insulator comprising a conductive block, an insulating body and a flange ring, wherein the conductive block is located in a central region of the disk-shaped insulator and the flange ring forms an edge region of the disk-shaped insulator. The insulating body is made of resin, which is poured in such a way as to surround the conductive block. The flange ring is connected to the insulating body and has holes distributed around its periphery. The disk-shaped insulator is connected to a flange by bolts passing through holes, and has radial dimensions adapted to those of the flange.

The connection between the insulating body and the flange ring is of the utmost importance in preventing leakage of pressurized gas. However, since the metal from which the flange ring is formed has different expansion properties from the resin which forms the insulating body, the insulating body will contract once the poured resin has cooled, and perhaps reduce the airtightness of the connection as a result, or at least experience a change in radial dimensions and thereby affect precision.

BRIEF SUMMARY OF THE INVENTION

The object of the present invention is to provide a disk-shaped insulator of high precision and low cost. To this end, the disk-shaped insulator of the present invention comprises a conductive block and an insulating body, wherein the conductive block is located in a central region of the disk-shaped insulator. The radial dimensions of the insulating body are adapted to those of a flange used for connecting. Multiple holes are distributed over an edge region of the disk-shaped insulator, and the edge region is covered by a conductive coating. Since the conventional metal flange ring is dispensed with, differences in expansion properties of different materials are no longer present, and so precision can be better maintained while the cost of the disk-shaped insulator is lowered. At the same time, since the conductive coating can establish an electrical connection in the edge region, the function of grounding the electrical device housing, originally served by the metal flange ring, is unaffected.

According to one aspect of the present invention, the insulating body comprises at least three reinforcing pieces which are distributed uniformly along the edge region and protrude in radial directions. Each of the reinforcing pieces comprises an opening, the disk-shaped insulator being connected to the flange by means of the openings. The reinforcing pieces make the connection between the disk-shaped insulator and flange more reliable, thereby avoiding leakage of pressurized gas.

According to another aspect of the present invention, the insulating body is made of resin.

According to another aspect of the present invention, each of the holes and the openings in the insulating body is formed by a cylinder surrounded by resin. The cylinders can better maintain the shape of the holes and openings, and accomplish a better connection when bolts are passed through the holes or openings.

According to another aspect of the present invention, the cylinder is made of metal. The metal cylinder has better strength.

According to another aspect of the present invention, a groove is arranged adjoining the edge region. The groove helps to accomplish a better seal.

According to another aspect of the present invention, a transition region of the disk-shaped insulator is located between the central region and the edge region, a groove being located between the transition region and the edge region. The transition region helps to accomplish better insulation.

Preferred embodiments are described below in a clear and easily understandable way with reference to the accompanying drawings, so as to further illustrate the above characteristics, technical features, advantages and embodiments of the present invention.

Figure 1:
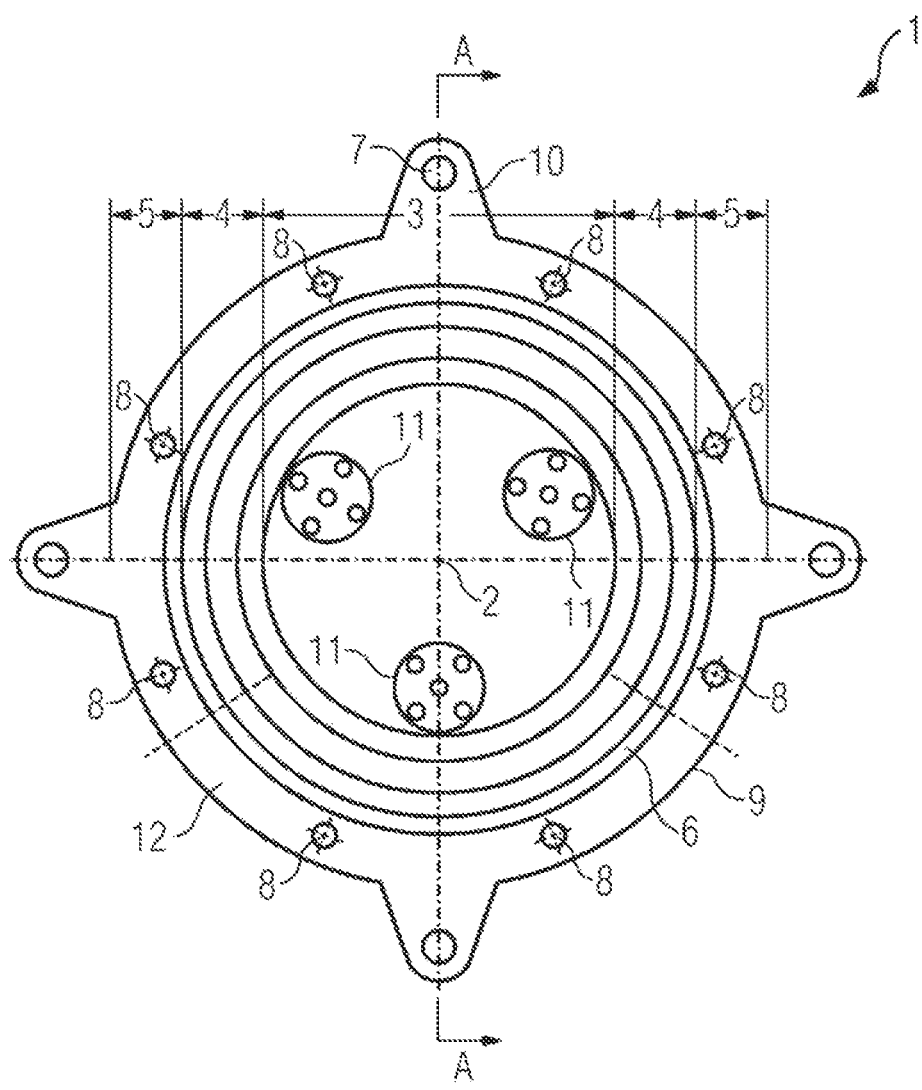
FIG. 1 shows an embodiment of the disk-shaped insulator of the present invention schematically.

EXPLANATION OF LABELS 1 disk-shaped insulator
2 axis
3 central region
4 transition region
5 edge region
6 groove
7 opening
8 hole
9 ridge
10 reinforcing piece
11 conductive block
12 insulating body

DESCRIPTION OF THE INVENTION

In order that the technical features, object and effects of the present invention may be understood more clearly, particular embodiments of the present invention are now described with reference to the accompanying drawings, in which identical labels indicate identical components or components which are similar in structure but have the same function.

In order that the drawings may appear concise, only those parts which are relevant to the present invention are represented schematically in the drawings; they do not represent the actual structure thereof as a product. In addition, in order to make the drawings appear concise for ease of understanding, in the case of components with the same structure or function, in some drawings only one of these is drawn schematically, or only one is labeled.

FIG. 1 shows an embodiment of the disk-shaped insulator 1 of the present invention. The disk-shaped insulator 1 comprises three conductive blocks 11 and one insulating body 12, wherein the conductive blocks 11 are located in a central region 3 of the disk-shaped insulator 1. The radial dimensions of the insulating body 12 are adapted to those of a flange (not shown) used for connecting. The flange may be located on a housing of a gas insulated metal-enclosed switch device. Eight holes 8 are uniformly distributed over an edge region 5 of the disk-shaped insulator 1 around an axis 2 of the disk-shaped insulator 1. The edge region 5 is covered by a conductive coating. Since the radial dimensions of the insulating body 12 are adapted to the flange used for connecting, the metal flange ring in the prior art is dispensed with. Moreover, since differences in expansion properties of different materials (i.e. the metal from which the flange ring is formed and the resin which forms the insulating body) are no longer present, the precision of the disk-shaped insulator can be better maintained. In addition, since the resin used to replace the flange ring is cheaper, the cost of the disk-shaped insulator is also reduced. In order to preserve the grounding function originally served by the metal flange ring, the edge region 5 of the disk-shaped insulator 1 is covered by a conductive coating to establish a conductive path, wherein the edge region 5 comprises not only corresponding regions (see FIG. 1) on either side of the disk-shaped insulator 1, but also a ridge part 9 of the disk-shaped insulator 1. As a result, the function of grounding between electrical device housings (not shown) separated by the disk-shaped insulator is not affected. Although the embodiment shown in FIG. 1 comprises three conductive blocks, those skilled in the art will understand that the disk-shaped insulator could have more or fewer conductive blocks depending on the number of phases used in the electrical device as required, while the number of holes 8 could also be increased or decreased as required.

As similarly shown in FIG. 1, the insulating body 12 comprises four reinforcing pieces 10 which are distributed uniformly along the edge region 5 and protrude in radial directions. The radial directions referred to herein are with respect to the disk-shaped insulator, and are perpendicular to the axis 2. Each of the reinforcing pieces 10 has an opening 7, the disk-shaped insulator 1 being connected to the flange by bolts (not shown) inserted in the openings 7. The reinforcing pieces 10 are made of resin, and are preferably poured at the same time as the insulating body 12 so as to be integrally formed therewith. The number of reinforcing pieces 10 may also be three or more than four. The insulating body 12 may also be made of another insulating material that fulfils the requirements.

In view of the fact that the mechanical performance of resin falls short of that of the metal previously used to make the flange ring, cylinders may be used to form openings 7 and/or holes 8 in the insulating body 12. The cylinders can be surrounded by resin during pouring, or inserted after the openings 7 or holes 8 are formed. The cylinders may be made from metal or non-metallic material, as long as the mechanical performance thereof fulfills the requirements.

Figure 2:
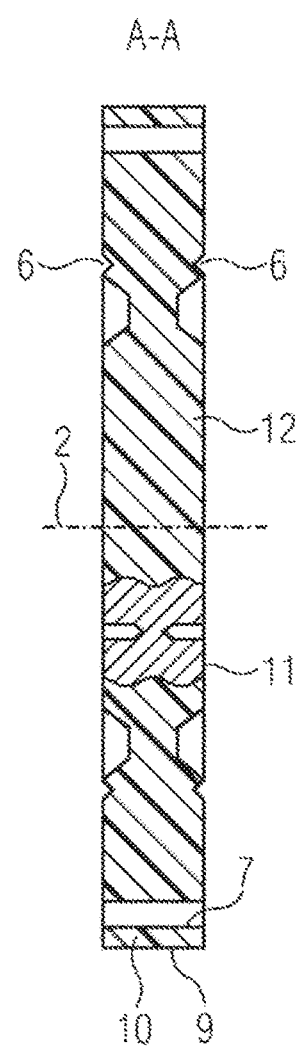
FIG. 2 shows a sectional view along section A-A of the disk-shaped insulator in FIG. 1 schematically.

The grooves 6 shown in FIGS. 1 and 2 are arranged adjoining the edge region 5 of the disk-shaped insulator 1. When the disk-shaped insulator 1 is connected to a part of an electrical device (for instance a flange of a device housing), the grooves 6 help to accomplish a better seal. Additional components (such as seals) may be installed in the grooves 6 to guarantee airtightness.

FIG. 1 also shows a transition region 4 of the disk-shaped insulator 1, located between the central region 3 and edge region 5, wherein an indentation of the transition region 4 helps to accomplish better insulation. In this case, the grooves 6 are located between the edge region 5 and transition region 4 of the disk-shaped insulator 1.

"Schematic" as used herein indicates "serving as an instance, example or illustration"; no drawings or embodiments described herein as "schematic" should be interpreted as a more preferred or more advantageous technical solution.

The series of detailed illustrations set forth above are nothing more than specific illustrations of feasible embodiments of the present invention, and are by no means intended to limit the scope of protection of the present invention. All equivalent embodiments or modifications made without departing from the artistic spirit of the present invention should be included within the scope of protection thereof.

The invention claimed is:

1. A disk-shaped insulator, comprising:
   a central region;
   a conductive block disposed in said central region of the disk-shaped insulator;
   an insulating body having radial dimensions adapted to those of a flange to be connected to;
   an edge region having multiple holes formed therein and distributed over said edge region of the disk-shaped insulator, said edge region having sides including an upper side, a lower side and a connecting side connecting said upper side to said lower side; and
   a conductive coating covering said upper side, said lower side and said connecting side of said edge region and having characteristics of a layer having been directly coated onto said edge region.

2. The disk-shaped insulator according to claim 1, wherein said insulating body has at least three reinforcing pieces distributed uniformly along said edge region and protrude in radial directions, each of said reinforcing pieces having an opening formed therein, and the disk-shaped insulator is connected to the flange by means of the openings.

3. The disk-shaped insulator according to claim 2, wherein each of said holes and said openings in said insulating body is defined by a cylinder surrounded by resin.

4. The disk-shaped insulator according to claim 3, wherein said cylinder is made of metal.

5. The disk-shaped insulator according to claim 1, wherein said insulator body is made of resin.

6. The disk-shaped insulator according to claim 1, wherein said insulating body having a groove formed therein and disposed adjoining said edge region.

7. The disk-shaped insulator according to claim 1, further comprising a transition region disposed between said central region and said edge region, said insulating body having a groove formed therein disposed between said transition region and said edge region.

8. The disk-shaped insulator according to claim 1, further comprising hollow metal cylinders disposed in said insulating body and defining said holes in said insulating body, said hollow metal cylinders extending completely through said insulating body.

* * * * *